United States Patent [19]
Kameda

[11] Patent Number: 5,828,372
[45] Date of Patent: Oct. 27, 1998

[54] INFORMATION PROCESSING SYSTEM

[75] Inventor: Masami Kameda, Yokohama, Japan

[73] Assignee: Hitachi, Ltd., Tokyo, Japan

[21] Appl. No.: 378,605

[22] Filed: Jan. 26, 1995

[30] Foreign Application Priority Data

Jan. 26, 1994 [JP] Japan .................................. 6-007086

[51] Int. Cl.$^6$ .................................................. G06F 15/00
[52] U.S. Cl. ........................ 345/330; 345/145; 345/331
[58] Field of Search ................................ 395/155, 156,
395/157, 158, 159, 160, 161, 153, 154;
345/157, 158, 163, 329, 330, 331, 332,
971, 145

[56] References Cited

U.S. PATENT DOCUMENTS

| 5,008,853 | 4/1991 | Bly et al. ................................ 345/331 |
| 5,168,269 | 12/1992 | Harlan .................................... 345/145 |

FOREIGN PATENT DOCUMENTS

| 62-53084 | 3/1987 | Japan . |
| 2-176976 | 7/1990 | Japan . |
| 4-284791 | 10/1992 | Japan . |
| 5-83413 | 4/1993 | Japan . |

OTHER PUBLICATIONS

Maeno et al., "Distributed Desktop Conferencing System (MERMAID) Based on Group Comm. Architecture"; 1991; pp. 520–525.
Watabe et al., "Distributed Desktop Conferencing System with Multiuser Multimedia Interface"; 1991; pp. 531–539.
Stefik et al., "WYSIWIS Revised: Early Experiences with Multiuser Interfaces"; 1987; pp. 148–167.
Ensor et al., "The Rapport Multimedia Conferencing System–A Software Overview"; 1988; pp. 52–58.

*Primary Examiner*—Huynh-Ba
*Attorney, Agent, or Firm*—Antonelli, Terry, Stout & Kraus, LLP

[57] ABSTRACT

An information processing system which includes control apparatus for controlling the operation of a plurality of information processing apparatuses. The control apparatus controls the information processing system to permit an application program stored in one of the plurality of information processing apparatuses to be operated from any input device of the plurality of information processing apparatuses such that the results of information processing of the application program are displayed onto each display device. Each display device of the plurality of information processing apparatuses displays information regarding operation of an application program and an indication mark indicating an arbitrary position based on screen coordinates input from any input device of the plurality of information processing apparatuses. The control apparatus performs the control of the information processing system by transferring information of operation of the application program and indication mark operation input from any input device of the plurality of information processing apparatuses to the application program and an indication mark program while displaying information of the operation of the application program and movement of the indication mark on each display device of the plurality of information processing apparatuses.

4 Claims, 9 Drawing Sheets

USER A

USER B

← ———— INPUT INFO.

← — — — OUTPUT INFO.

FIG. 4

FIG. 5A
DISPLAY FOR USER A

FIG. 5B
DISPLAY FOR USER B

FIG. 8

USER A

USER B

◄——— INPUT INFO.

◄— — — OUTPUT INFO.

FIG. 10A PRIOR ART
DISPLAY FOR USER A

FIG. 10B PRIOR ART
DISPLAY FOR USER B

INFORMATION PROCESSING SYSTEM

BACKGROUND OF THE INVENTION

The present invention relates to an information processing system which can display the same display information of a program on a plurality of terminals on a network to allow a briefing or a meeting to be conducted by viewing the same display information. More particularly, the present invention relates to an information processing system in which mouse manipulation by one user may be recognized by other users on a network by displaying information regarding the mouse, manipulation and information of an indication mark on the display of each terminal on the network.

As described in Japanese Patent Laid-open application Nos. 2-176976 and 4-284791, there is a known conventional system wherein an information processing system displays the same display information of a program on a plurality of terminals on a network to allow a briefing or meeting to be conducted by a plurality of meeting attendees, each viewing the same display information.

However, the conventional system described above only displays an indication mark on each display of the terminals on the network to indicate a particular point on the display to other viewers, and has a disadvantage of not allowing the displayed program to be operated by a mouse using a cursor.

Figure 10A:
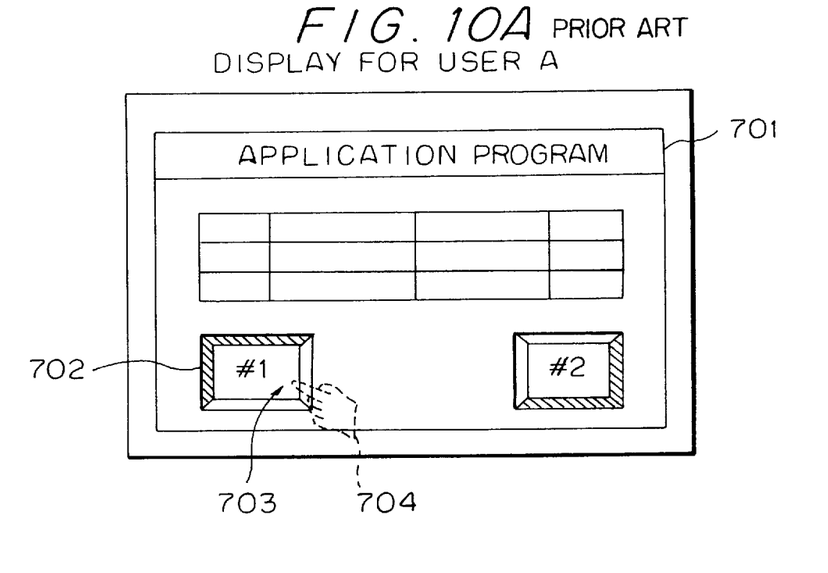
FIG. 10 is a schematic diagram illustrating the display screen of an application program being displayed on a display device of a terminal apparatus of the prior art.
Figure 10B:
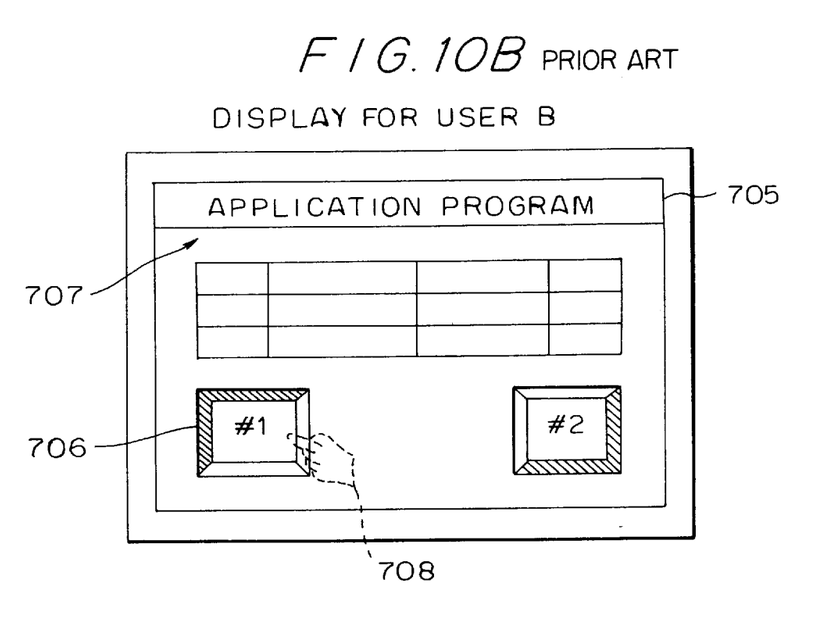

The disadvantage of the conventional system will be described in detail below referring to FIG. 10. FIG. 10 illustrates the display for users A and B at respective terminals on the network of the conventional system.

In FIG. 10, reference numeral 701 designates display information of an application program of user A, 702 and 706 buttons on the displayed application program, 703 and 707 mouse cursors, 704 and 708 indication marks, and 705 a display of an application program of user B.

FIG. 10 illustrates the situation where user A intends to teach user B how to operate an application program and where the display information displayed at the display screens for users A and B respectively is generated based on manipulation of the application program. Thus, when user A operates the application program by manipulation, the display screen for user A changes, and the display screen of the terminal of user B is updated. In the above-described environment it is possible for user B at a remote location to learn how to operate the application program by listening to an explanation provided by user A via telephone and viewing the manipulation of the application program on the display screen. However, user B may experience some difficulty in learning how to manipulate the application program due to the speed at which information displayed on the display screen changes.

For example, assuming in FIG. 10 that user A actually presses the #1 button 702 by using the mouse cursor 703 so as to demonstrate that pressing the #1 button 702 causes the display of the #2 display. On the display of user A, the mouse cursor 703 will be placed on the #1 button 702 and then the #1 button 702 will be pressed. However, the mouse cursor 707 on the display of user B is controlled by user B. Thus, on the display of user B the cursor 707 is not put on the #1 button 706 mimicking the movement of mouse cursor 703 on the display of user A. The display of user B merely displays a momentary change in the image being displayed representing the pressing of #1 button 706. Thus momentary change in image occurs rather quickly. Therefore, when the #1 button 706 is solely pressed, when there are a number of #1 buttons 706 or when the #2 display changes quickly, the problem arises that user B cannot understand which button has been pressed.

Further, as illustrated in FIG. 10, when user A presses the #1 button 702 and uses indication mark 704 to indicate that the #1 button 702 has been pushed, indication mark 708 may be operated to mimic indication mark 704 on the display of user B to demonstrate that pressing the #1 button causes the display of the #2 display. In this case, although user B can recognize on the display that the indication mark 708 has been placed on the #1 button 702, the indication marks 704 and 708 only indicate positions on the respective display screens and do not operate the program. Therefore, user A can not effectively demonstrate the operation sequence of the program.

As described in Japanese Patent Laid-open application Nos. 5-83413 and 62-53084, there is known a video conference system having at least two terminals wherein one terminal is a local terminal and the other terminal is a remote terminal. In the conventional video conference system, display screens are provided at both the local and remote terminals. Apparatus is provided for permitting the local terminal to control the display of a cursor on the display screen of the local terminal and the display screen of the remote terminal. Apparatus is also provided for permitting the remote terminal to control the display of a cursor on the display screen of the remote terminal and the display screen of the local terminal. Thus, in the conventional video conference system, the display screen of each terminal has displayed thereon two cursors, one of the cursors being controlled by the terminal and the other cursor being controlled by another terminal.

The further conventional video conference system suffers from the same deficiencies described above, being that, a user at the remote terminal being taught how to use a program by a user at the local terminal may experience difficulty in learning how to manipulate the program due to the speed at which information displayed on the display screen at the remote terminal changes. Further, the user at the local terminal cannot effectively demonstrate the operation sequence of the program when indication marks on the display screens of the local and remote terminals are used.

SUMMARY OF THE INVENTION

An object of the present invention is to provide a method and apparatus for allowing the operation of an application program in such a manner to permit users at remote locations to easily learn and follow, by viewing display screens at the remote locations, the precise sequence of operation of the application program.

Another object of the present invention is to provide a method and apparatus for allowing the operation of an application program in such a manner to permit users at remote locations to easily learn and follow the precise sequence of operation of the application program, by viewing on the display screens at the remote locations the manipulation of an indication mark which closely follows the movement of a cursor used to operate the application program.

One Embodiment of the present invention provides an information processing system which includes a plurality of information processing apparatuses each having an input device, a display device and a terminal control device. The information processing apparatuses are connected to each other through at least one communication line. The input device includes at least a keyboard and a mouse, and the terminal control device controls the input device and the display device and is connected to the communication line. An application program, stored in one of the plurality of information processing apparatuses, is operated from any one of the input devices of the plurality of information processing apparatuses. The information processing apparatus which stores the application program transfers the results obtained due to execution of the application program by the information processing apparatus to the other information processing apparatuses, to cause the display devices of the other information processing apparatuses to display the same display information being displayed on the display device of the information processing apparatus which stores the application program.

The information processing apparatus which stores the application program also stores an indication mark program. The indication mark program, when executed, generates information for displaying an indication mark to indicate an arbitrary position on the display device of the information processing apparatus and the display devices of the other information processing apparatuses based on screen coordinates input from any one of the input devices of the plurality of information processing apparatuses and transfers the information to the other information processing apparatuses. This allows the same indication mark to be displayed on each display device of the plurality of information processing apparatuses.

Another embodiment of the present invention provides an information processing system which includes a plurality of information processing apparatuses each having an input device, a display device and a terminal control device. The input device includes at least a keyboard and a mouse, and the terminal control device controls the input device and the display device. The plurality of information processing apparatuses are connected to each other by a communication line.

In this embodiment a copy of an application program is stored in each of the plurality of information processing apparatuses. The copies of the application program are operated in response to input information from any one of the input devices of the plurality of information processing apparatuses. Each of the plurality of information processing apparatuses displays the results obtained due to execution of the application program and in response to the input information onto the display device thereof. Since the same application program is executed in each of the information processing apparatuses, the display screens of the display devices of the plurality of information processing apparatuses display the same information.

Each of the plurality of information processing apparatuses also stores a copy of an indication mark program. The indication mark program, when executed in each information processing apparatus and in response to input information from any one of the input devices, generates information for displaying an indication mark to indicate an arbitrary coordinate position on the display device of the information processing apparatus. Since the same indication mark program is executed in each of the information processing apparatuses, the same display of an indication mark is displayed on each of the display devices of the plurality of information processing apparatuses.

Further the present invention provides an information processing system set forth in the above described embodiments having apparatus for switching and selecting among a state for operating an application program only, a state for operating indication mark program only, and a state for operating both application programs and indication mark program.

Still further, the present invention provides an information processing system wherein the input information for an indication mark may be transferred to the application program. This feature of the present invention allows for an information processing system such as video-conference system to be operated through an application program by using an indication mark rather than a cursor.

Still further yet, the present invention provides a control apparatus for controlling the display of information of on display screens of a plurality of information processing apparatuses connected to each other by a communication line. The control apparatus of the present invention controls the display of information regarding the operation of an application program or the movement of an indication mark on the display screens of a plurality of information processing apparatuses such that the same display information is displayed on each of the display screens of the plurality of information processing apparatuses. The control apparatus accomplishes this by either transferring identical display information representing operation of an application program or movement of an indication mark on a display screen from the information processing apparatus that generated the display information to each of the other information processing apparatuses for display on the display screens thereof or by transferring input information inputted to any one of the information processing apparatuses from the one information processing apparatus to the other information processing apparatuses and, processing the input information at each of the information processing apparatuses so as to generate identical display information at the information processing apparatuses for display on respective display screens.

Thus, by use of the present invention as described above and when teaching how to operate an application program to other users, the manipulation of the cursor by an instructor may be demonstrated in such a manner to permit other users to easily learn and follow by viewing the display screen the precise sequence of operation of the application program.

Further, by use of the present invention and when teaching how to operate an application program to other users, the manipulation of the cursor by an instructor may be demonstrated in such a manner to permit the other users to easily learn and follow, by viewing on the display screen, the precise sequence of operation of the application program by causing the indication mark viewed by the other users to be manipulated similar to the cursor. Thus, the other users at the remote locations may learn the exact manipulation sequence of the application program by viewing the live movement of indication mark on their own display screen.

BRIEF DESCRIPTION OF DRAWINGS

The present invention will be more apparent from the following detailed description, when taken in conjunction with the accompanying drawings, in which.

DESCRIPTION OF THE PREFERRED EMBODIMENTS

Figure 1:
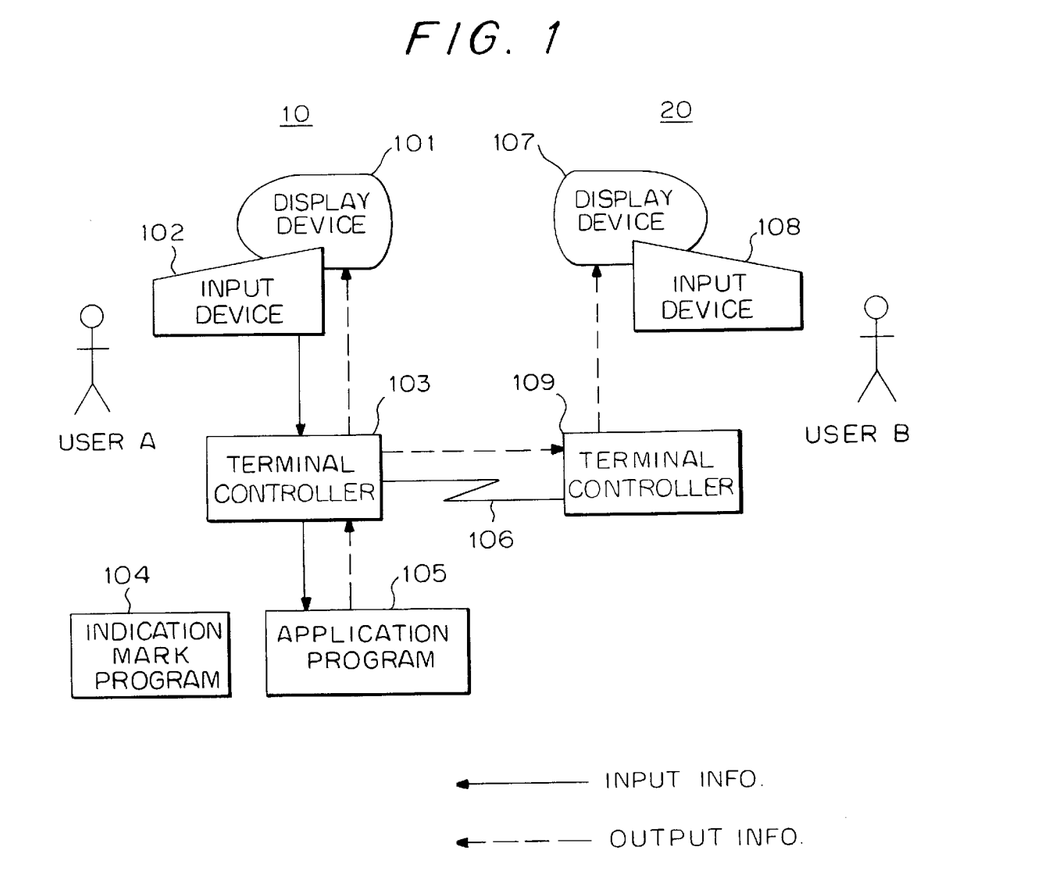
FIG. 1 is a block diagram illustrating a structure of an information processing system according to a first embodiment of the present invention and the flow of input and output information in the structure when operated in a program mode.

FIG. 1 shows a block diagram illustrating a structure of an information processing system according to a first embodiment of the present invention and the flow of input and output information when operating an application program in the structure in a program mode. In FIG. 1, the information processing system includes a plurality of information processing apparatuses, herein after referred to as "terminals". Thus, in FIG. 1 reference numeral 10 designates a terminal of user A, and 20 designates a terminal of user B.

The terminal 10 of user A and the terminal 20 of user B are connected to each other via at least one communication line 106. In the first embodiment, two terminals are interconnected through the communication line 106, while more than two terminals may be interconnected through a plurality of communication lines.

The terminal 10 includes a display device 101, an input device 102 having at least a keyboard and a mouse, and a terminal controller 103. The terminal 20 comprises a display device 107, an input device 108 having at least a keyboard and a mouse, and a terminal controller 109. In addition, the terminal 10 stores an indication mark program 104 and an application program 105.

Figure 2:
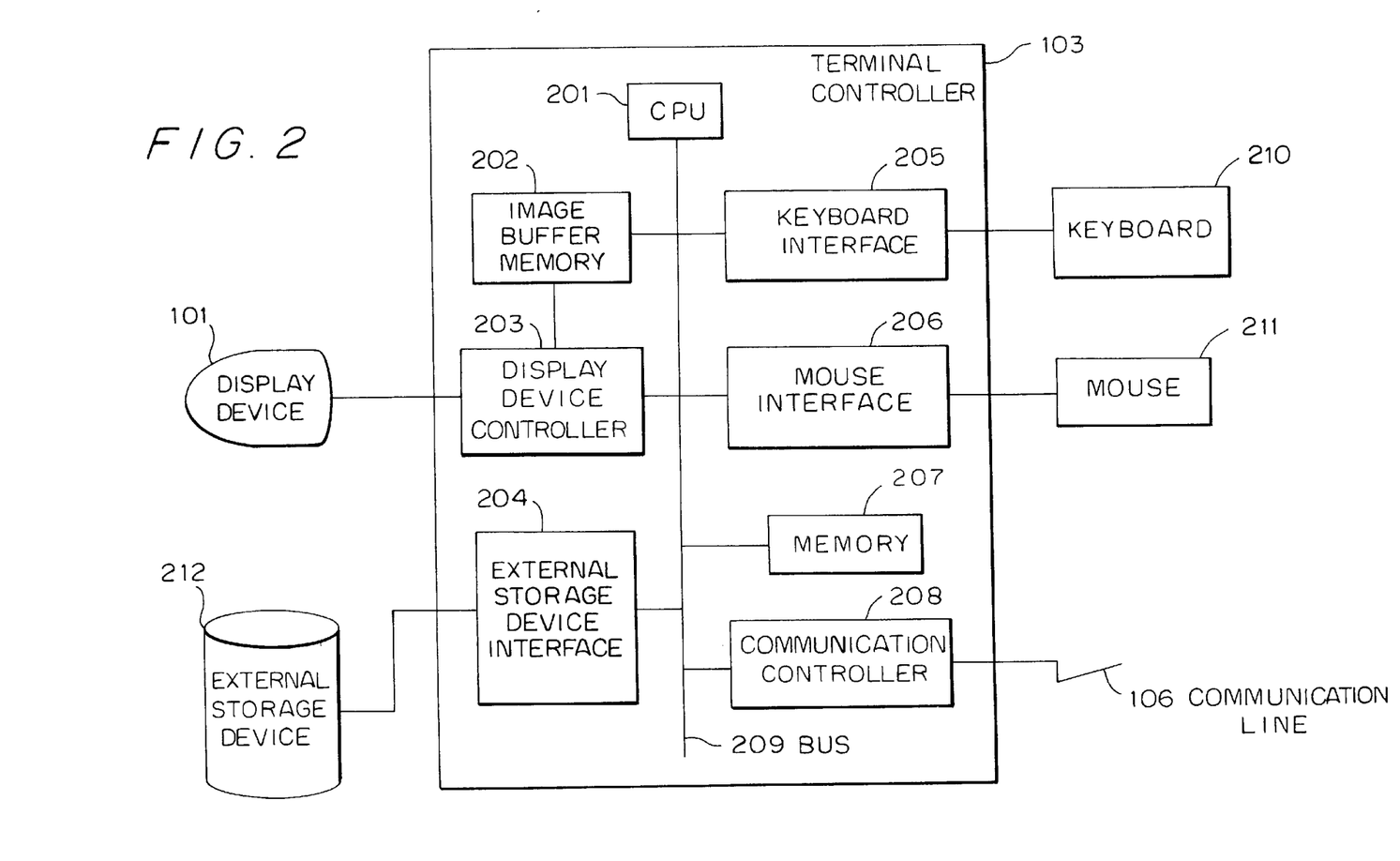
FIG. 2 is a block diagram illustrating the structure of a terminal controller 103 of FIG. 1.

FIG. 2 is a block diagram illustrating the structure of the terminal controller 103 of FIG. 1. Referring to FIG. 2, reference numeral 101 designates the display device, 106 the communication line, 201 a Central Processing Unit (CPU), 202 an image memory (buffer), 203 a display device controller, 204 an interface to external storage devices, 205 a keyboard interface, 206 a mouse interface, 207 a memory, 208 a communication controller, 209 a bus, 210 a keyboard, 211 a mouse, and 212 an external storage device. The input device 102 of FIG. 1 comprises the keyboard 210 and the mouse 211 shown in FIG. 2, which are controlled by the keyboard interface 205 and the mouse interface 206 of the terminal controller 103, respectively. The bus 209 interconnects the image memory 202, display device controller 203, external storage device interface 204, keyboard interface 205, mouse interface 206, memory 207 and communication controller 208 with the CPU 201. The CPU 201 controls the operation of the image memory 202, display device controller 203, external storage device interface 204, keyboard interface 205, mouse interface 206, memory 207 and communication controller 208 by use of the bus 209 so as to implement the functions of the terminal controller 103.

The display device controller 203 of the terminal controller 103 causes the display device 101 to display image information written into the image memory 202. The terminal 10 is connected for communication with another terminal 20 by using the communication controller 208 of the terminal controller. The operation modes of the terminals 10 and 20 in the first embodiment of the present invention includes three kind of modes: program mode, indication mark mode, and common mode.

Figure 4:
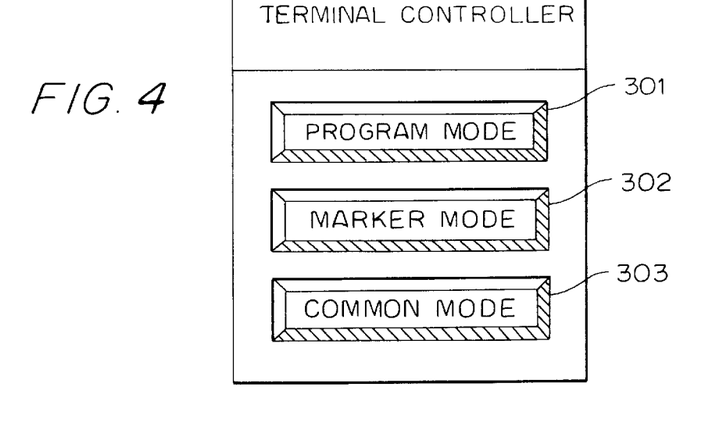
FIG. 4 is a schematic diagram illustrating operation mode selector buttons for switching between the program mode, a marker mode, and the common mode being displayed on a display device 101 for video-conference in FIG. 1.

FIG. 4 is a schematic diagram illustrating operation mode selector buttons. To switch among program, indication mark and common modes, a program mode button 301, indication mark mode button 302, and common mode button 303 displayed by a terminal controller on a display device as shown in FIG. 4 are used. Pushing the program mode button 301 changes the mode of operation of the terminal to the program mode, pushing the indication mark mode button 302 changes the mode of operation of the terminal to the indication mark mode, and pushing the common mode button 303 changes the mode of operation of the terminal to the common mode.

Referring again to FIG. 1, the flow of input and output information when user A operates the terminal under the program mode in the first embodiment will be described below. In the invention illustrated in FIG. 1, input information entered from the input device 102 is transferred through the terminal controller 103 to the application program 105. Input information is information such as coordinates on the screen of a display device, and/or selection/manipulation or button actuation signals output from the keyboard 210, and/or the mouse 211. In response to the input information, the application program 105, when executed, generates output information which is supplied to the terminal controller 103. The terminal controller 103 causes the output information to be displayed on the display device 101 of user A. At the same time, the output information is transferred by the terminal controller 103 through the communication line 106 to the terminal controller 109 of user B. The terminal controller 109 causes the display device 107 to display the output information. Thus, the same output information generated by the application program 105 will be displayed on the display devices 101 and 107 of users A and B, respectively.

Operating the terminals in the program mode also permits input information entered from the input device 108 of user B to be transferred to the application program 105, so that the output information generated by the application program 105 based on input information entered from the input device 108 of user B will be displayed on both display devices 101 and 107 in the same way as described above. Users A and B are therefore able to operate the application program 105 while viewing the same display.

Figure 3:
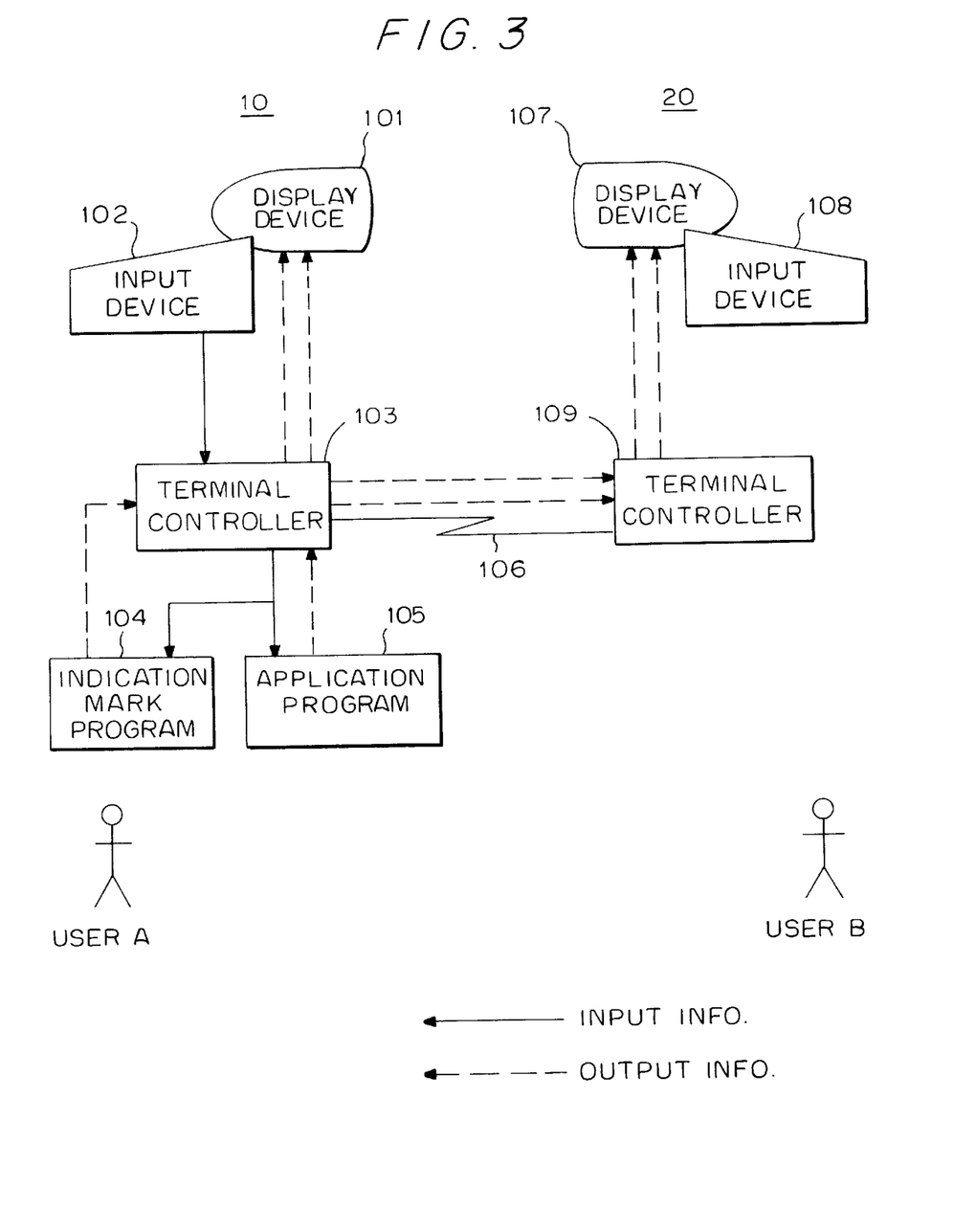
FIG. 3 is a block diagram illustrating the flow of input and output information when the first embodiment is operated in a common mode.

FIG. 3 is a block diagram of the first embodiment illustrating the flow of input and output information when the terminals are operated by user A in the common mode. As illustrated in FIG. 3, input information entered from the input device 102 is transferred to the terminal controller 103. Because the operation mode of the terminal controller 103 is in the common mode, the terminal controller 103 transfers the input information to the application program 105 and to the indication mark program 104, which controls the position of an indication mark on a screen of a display device.

Thus, in the common mode the input information is used not only for changing the position of the indication mark on the display device but also for operating the application program. The flow of the input and output information to and from the application program 105 is the same as that of the input and output information during program mode as described in FIG. 1. Further, the flow of input information entered from the input device 108 of user B is the same as that of the input information during the program mode as described in FIG. 1.

However, in the common mode when the input information arrives from, for example, the mouse 211, the indication mark program 104 transfers to the terminal controller 103 output information that an indication mark should be displayed at the coordinate specified by the input information. The terminal controller 103 causes the display device 101 of user A to display the output information from the indication mark program 104 at the position indicated by the mouse 211, and transfers the output information from the indication mark program 104 through the communication line 106 to the terminal controller 109 of user B. The terminal controller 109 causes the display device 107 to display the output information from the indication mark program 104 at the position indicated by the mouse 211. As a result, both the output information issued from the application program 105 and the output information from the indication mark program 104 will be displayed on the display devices 101 and 107.

In the indication mark mode, input information will be transferred to the indication mark program 104 only and the output information from the indication mark program 104 is displayed on the display devices 101 and 107.

Figure 5A:
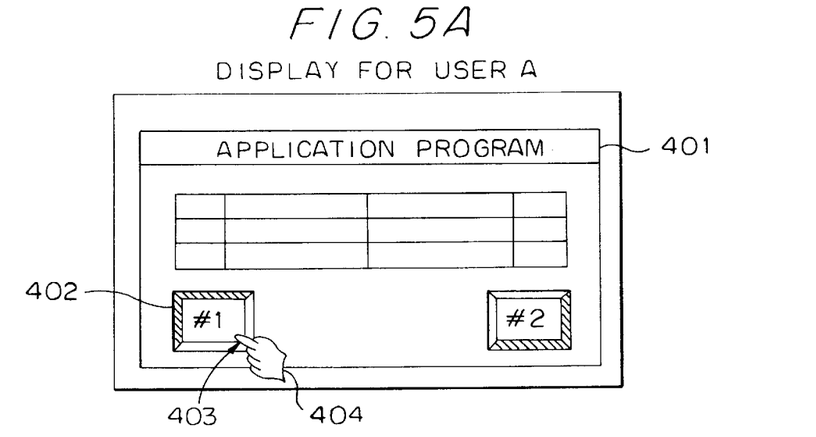
FIG. 5 is a schematic diagram illustrating the display of an application program being displayed on the display device 101 in FIG. 1.
Figure 5B:
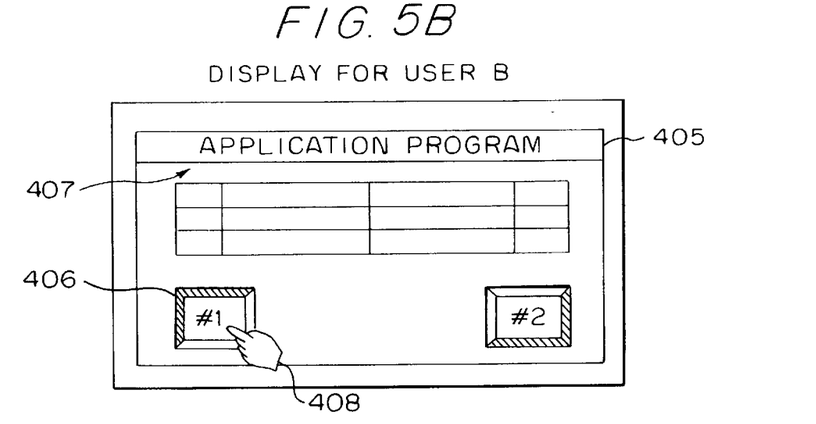

FIG. 5 is a schematic diagram illustrating the display being displayed on the display devices 101 and 107 when the terminals are operated in the common mode. In FIG. 5, reference numeral 401 designates a display of the application program on the display device of user A, and 405 designates a display of the application program on the display device of user B. During operation in the common mode the following occurs. At first, user A places mouse cursor 403 on #1 button 402 and then presses a mouse button thereby pressing #1 button 402 in the display. Since the terminals are being operated in the common mode, the indication mark 404 is put on the #1 button 402 along with the mouse cursor 403.

According to the first embodiment of the present invention, a signal indicating that a mouse button has been pressed is transferred to the application program 105, which in turn will output an image visually illustrating the pressing of the #1 button 402. On the display 405 of the application program on the display device of user B, a mouse cursor 407, which belongs to user B, is not necessarily put on a #1 button 406. However, the display 405 of the application program on the display device of user B will output an image visually illustrating the pressing of the #1 button 406 similar to the display of the #1 button 402 in the display 401 of user A. Further an indication mark 408 on the display 401 of user B is put on the #1 button 406 similar to the indication mark 404 in the display 401 of user A. At this time, by viewing that the indication mark 408 is put on the #1 button 406 and viewing the image visually illustrating the pressing of the #1 button 406 user B will recognize that user A has pressed the #1 button 402 which corresponds to the #1 button 406.

Figure 6:
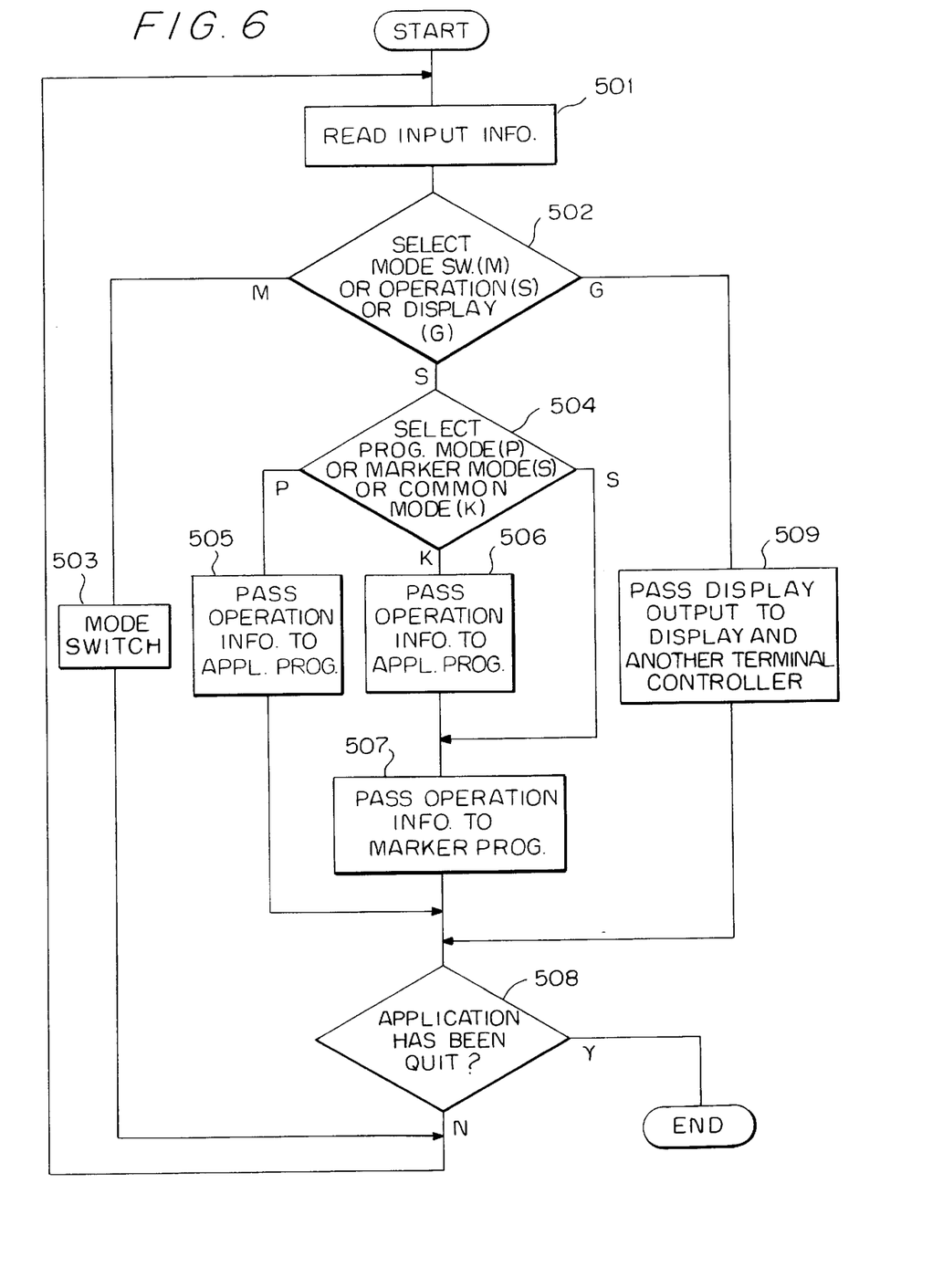
FIG. 6 is a flow chart illustrating the processing sequence of the terminal controller according to the first embodiment.

FIG. 6 shows a flow chart illustrating the processing sequence of the terminal controller 103 according to the first embodiment of the present invention. Referring now to FIG. 6, the processing sequence in the terminal controller 103 will be described below.

At first, in Step 501, input information is read from the input devices 102 and 108, the indication mark program 104 and the application program 105. Then in Step 502, it is determined whether the input information is a mode switching request from the input devices 102 and 108, operation information, or display output information from the indication mark program 104 and the application program 105.

If the information is determined in Step 502 to be a mode switching request from the input devices 102 and 108, the process proceeds to Step 503 to switch modes (program mode, indication mark mode, or common mode) and then returns to Step 501. If the information is determined in Step 502 to be operation information, the process proceeds to Step 504 to determine which mode is the current mode in use. If the current mode in use is determined to be the program mode in Step 504, the process proceeds to Step 505 to transfer the operation information to the application program 105.

If the current mode is determined to be the common mode in Step 504, the process proceeds to Step 506 to transfer the operation information to the application program 105, and to Step 507 to transfer the operation information to the indication mark program 104. If the current mode is determined to be the indication mark mode in Step 504, the process proceeds to Step 507 to transfer the operation information to the indication mark program 104.

Continuing with the process, if the input information is determined in Step 502 to be display output information, the process proceeds to Step 509 to display the display output information on the display device 101 connected to the terminal controller 103 and transfer the information to the terminal controller 109 of another party. Then in Step 508 it is determined whether the user has quit the application program 105. If the user has quit the application program 105 then the process terminates. If the user has not quit the application program 105 then the process proceeds to Step 501 to be repeated.

Figure 7:
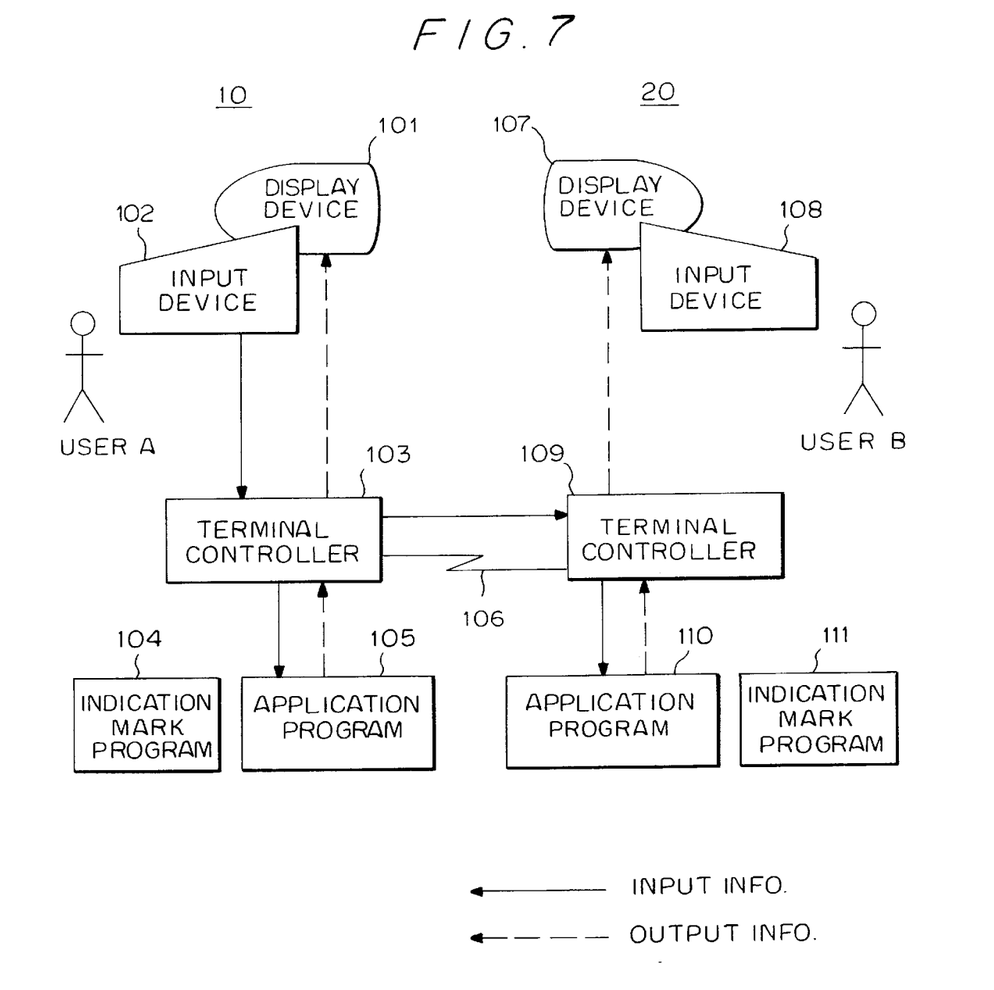
FIG. 7 is a block diagram illustrating a structure of an information processing system according to a second embodiment of the present invention and the flow of input and output information in the structure when operated in the program mode.

FIG. 7 shows a block diagram illustrating the structure of an information processing system according to a second embodiment of the present invention and the flow of input and output information when operating the terminal controllers 103 and 109 in the program mode. The information processing system of the second embodiment has the same components as the first embodiment described above, except that the terminal 20 also stores an indication mark program 111 and an application program 110, identical to the indication mark program 104 and the application program 105 stored in the terminal 10. Also in this embodiment, two or more terminals can be interconnected.

The operation modes of the terminals in the second embodiment includes three kinds of modes similar to the first embodiment: a program mode, an indication mark mode, and a common mode. To switch among program, indication mark and common modes, there are used a program mode button 301, an indication mark mode button 302, and a common mode 303 displayed by the terminal controllers 103 and 109 as shown in FIG. 4.

Referring now to FIG. 7, the flow of the input and output information when user A operates the terminals in the program mode in the second embodiment will be described below. The terminal controller 103, upon receipt of input information from the input device 102, transfers the information through the communication line 106 to the terminal controller 109. The terminal controllers 103 and 109 transfer the input information to respective application programs 105 and 110. The application programs 105 and 110 transfer the identical output information to the terminal controllers 103 and 109, which cause respective display devices 101 and 107 to display identical output information. Thus, users A and B will be able to view the same display. In addition, the above described process will be the same when user B inputs input information.

Figure 8:
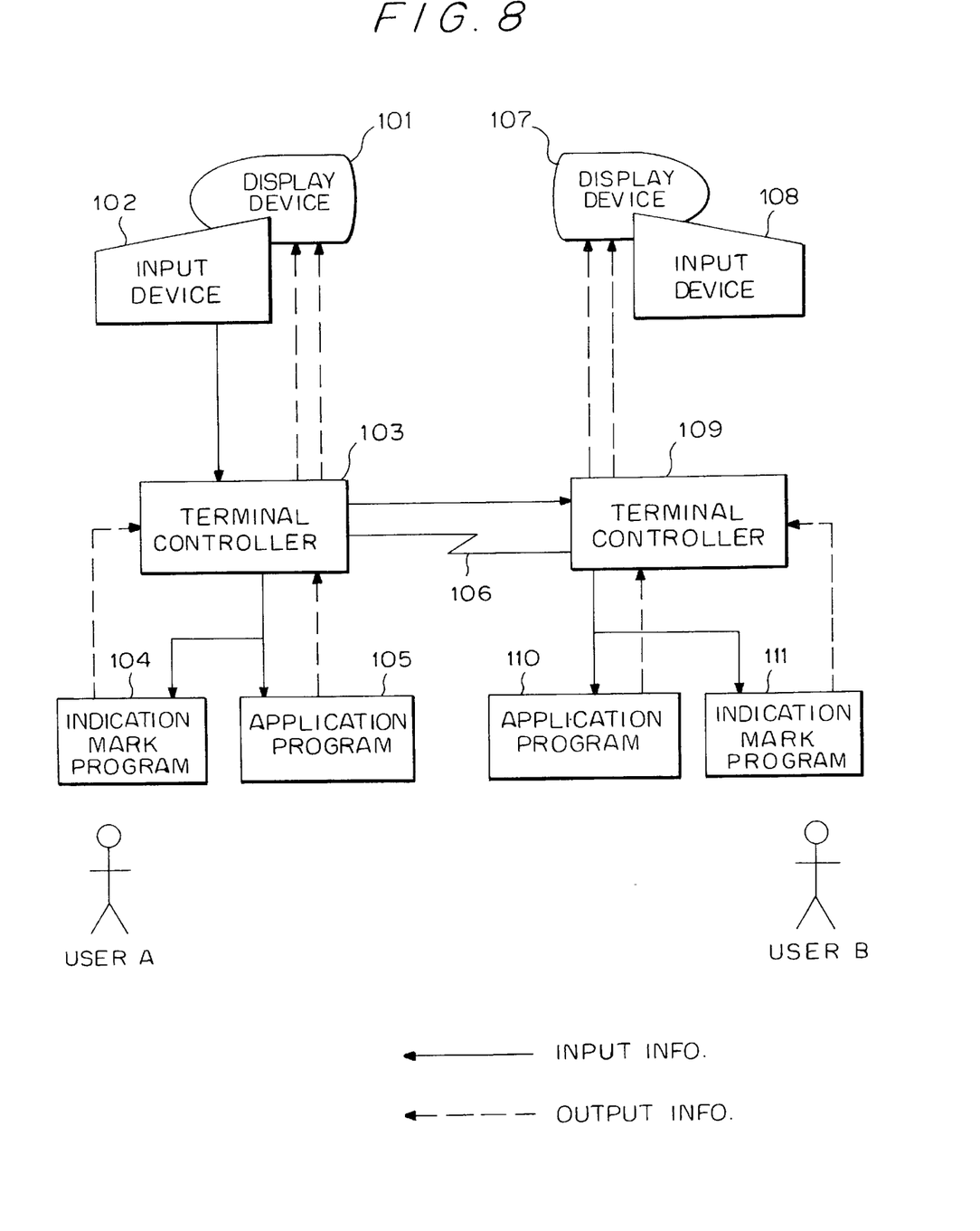
FIG. 8 is a block diagram illustrating the flow of input and output information when the second embodiment is operated in the common mode.

FIG. 8 shows the flow of input and output information when operating the terminals in the common mode according to the second embodiment of the present invention. Referring now to FIG. 8, the flow of input and output information when operating the terminals in the common mode according to the second embodiment will now be described below.

The terminal controller 103, upon receipt of input information entered from the input device 102, transfers the information through the communication line 106 to the terminal controller 109. The terminal controllers 103 and 109 transfer the input information not only to each of the application programs 105 and 110 but also to each of the indication mark programs 104 and 111. The application programs 105 and 110 and the indication mark programs 104 and 111 transfer identical output information to the terminal controllers 103 and 109 respectively, which causes the respective display devices 101 and 107 to display the identical output information. As a result, users A and user B will be able to view the same display. In addition, the process will be the same when user B inputs input information.

In the indication mark mode of the second embodiment input information is transferred only to the respective indication mark programs 104 and 111 and output information from the respective programs are transferred to respective displays 101 and 107.

Figure 9:
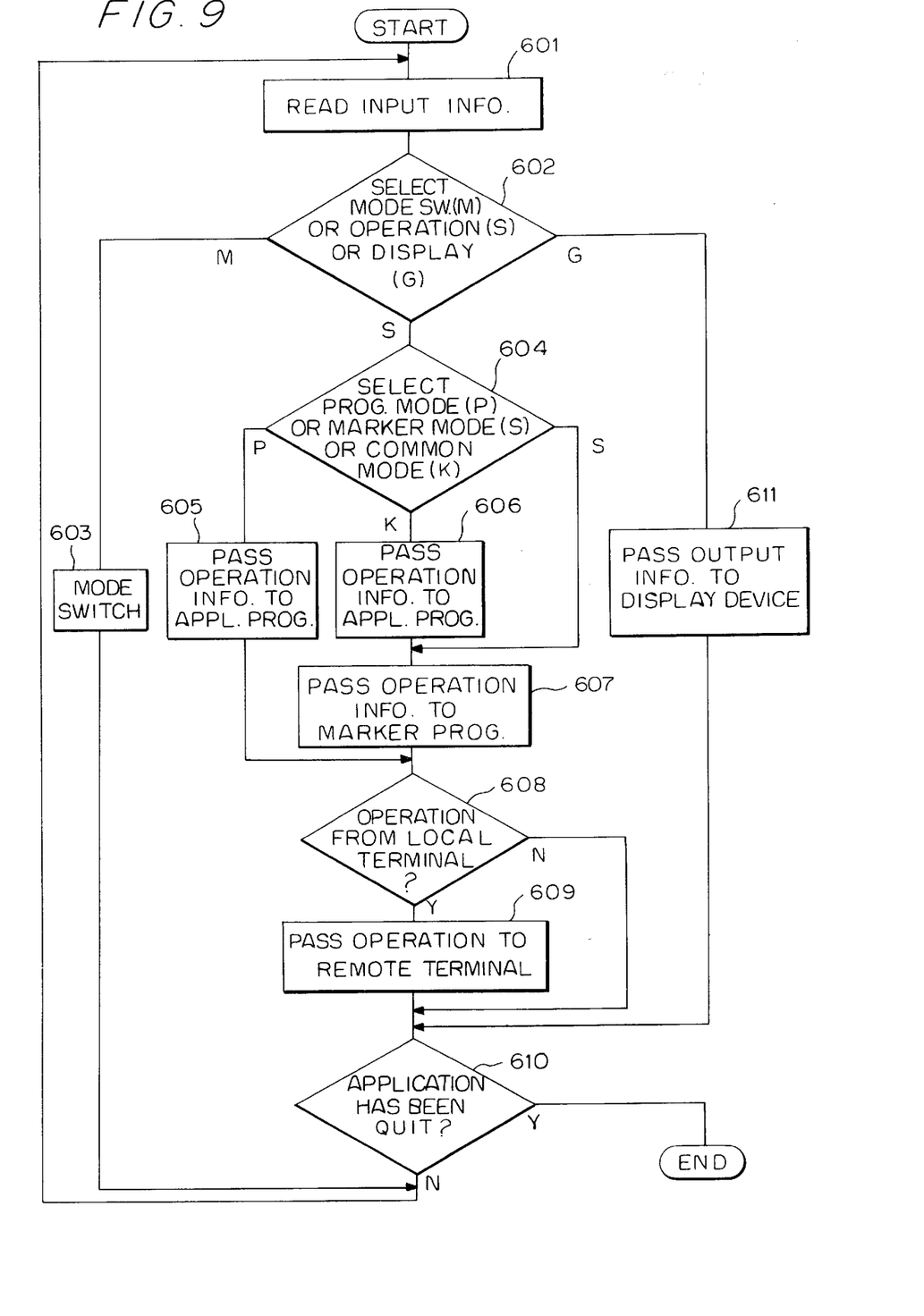
FIG. 9 is a flow chart illustrating the processing sequence of the terminal controller according to the second embodiment.

FIG. 9 is a flow chart showing the processing sequence of the terminal controller 103 according to the second embodiment of the present invention. At the beginning, in Step 601, input information is read from the input devices 102 and 108, the indication mark program 104 and the application program 105. Then in Step 602, it is determined whether the input information is a mode switching request from the input devices 102 and 108, operation information, or display output information from the indication mark program 104 and the application program 105.

If the input information is determined in Step 602 to be a mode switching request from the input devices 102 and 108, the process proceeds to Step 603 to switch modes (program mode, indication mark mode, or common mode) and then returns to Step 601. If the information is determined in Step 602 to be operation information, the process proceeds to Step 604 to determine which mode is the current mode.

If the current mode is determined to be the program mode in Step 604, the process proceeds to Step 605 to transfer the operation information to the application program 105. If the current mode is determined to be the common mode in Step 604, the process proceeds to Step 606 to transfer the operation information to the application program 105, and then to Step 607 to transfer the operation information to the indication mark program 104. If the current mode is determined to be the indication mark mode in Step 604, the process proceeds to Step 607 to transfer the operation information to the indication mark program 104.

After the above, it is determined in Step 608 whether the operation information is derived from its own terminal. If the operation information is derived from its terminal in Step 608, the process proceeds to Step 609 to transfer the operation information to the remote terminal controller 109. If the operation information is not derived from its own terminal in Step 608, then the process proceeds to Step 610.

If the input information is determined in Step 602 to be display output information, then the process proceeds to Step 611 to display the display output information on its own display device. Then in Step 610 it is determined whether the user has quit the application program 105. If the user has quit the application program 105 then the process terminates. If the user has not quit the application program 105 then the process is returned to Step 601 to be repeated.

As described above, since in the information processing system according to the present invention, input information for an indication mark is transferred to application programs, an application program may be operated with an indication mark in an information processing system such as a videoconference system. As a result, when teaching how to operate an application program to another user of such video-conference system, the manipulation of the mouse cursor of an instructor may be demonstrated to others while using an indication mark. Therefore other users at remote locations may learn the exact manipulation sequence of the application program by viewing the live movement of the indication mark on their own display screens.

While the present invention has been described in detail and pictorially in the accompanying drawings it is not limited to such details since many changes and modifications recognizable to those of ordinary skill in the art may be made to the invention without departing from the spirit and the scope thereof.

I claim:

1. An information processing system having a plurality of information processing apparatuses each including an input device, a display device and a terminal control device, said plurality of information processing apparatuses being connected to each other by a communication line, said input device having at least a keyboard and a mouse, said terminal control device comprising:

first means for controlling said input device and said display device and communication on said communication line; and second means for operating an application program stored in said information processing apparatus in response to input information from any one of said input devices of said plurality of information processing apparatuses and transferring results obtained from operation of said application program to said display device and to the display devices of the other information processing apparatuses such that the same results obtained from operation of said application program are displayed on each display device of said plurality of information processing apparatuses;

third means for transferring information for displaying an indication mark to indicate an arbitrary position on a screen to said display device and the display devices of the other information processing apparatuses in response to input information from any one of said input devices such that the same information for displaying said indication mark is displayed on each display device of said plurality of information processing apparatuses; and means for selectively enabling one of a program state during which said third means is not permitted to operate, an indication mark state during which said second means is not permitted to operate and a common state during which said second and third means are permitted to operate.

2. In an information processing system having a plurality of information processing apparatuses each including an input device, a display device and a terminal control device, said plurality of information processing apparatuses being connected to each other by a communication line, said input device having at least a keyboard and a mouse, said terminal control device comprising:

first means for controlling said input device, and said display device and communication on said communication line;

second means for operating copies of an application program respectively stored in said plurality of information processing apparatuses in response to input information from any one of said input devices of said plurality of information processing apparatuses and transferring results obtained from operation of said copies of said application program to respective display devices of said plurality of information processing apparatuses such that the same results obtained by operation of said copies of said application program are displayed on said display device of said plurality of information processing apparatuses;

third means for displaying indication marks to indicate an arbitrary position on the screens of said display devices of said plurality of information processing apparatus in response to said input information from any one of said input devices such that the same indication mark is displayed on each display device of said plurality of information processing apparatuses; and means for selectively enabling one of a program state during which said third means is not permitted to operate, an indication mark state during which said second means is not permitted to operate, and a common state during which said second and third means are permitted to operate.

3. A method of controlling display of information in an information processing system having a plurality of information processing apparatuses each including an input device, a display device and a terminal control device, said plurality of information processing apparatuses being connected to each other by a communication line, said input device having at least a keyboard and a mouse, said method comprising:

a first step of controlling said input device and said display device and communication on said communication line;

a second step of operating an application program stored in said information processing apparatus in response to input information from any one of said input devices of said plurality of information processing apparatuses and transferring results obtained from operation of said application program to said display device and to the display devices of the other information processing apparatuses such that the same results obtained from operation of said application program are displayed on each display device of said plurality of information processing apparatuses;

a third step of transferring information for displaying an indication mark to indicate an arbitrary position on a screen to said display device and the display devices of the other information processing apparatuses in response to input information from any one of said input devices such that the same information for displaying said indication mark is displayed on each display device of said plurality of information processing apparatuses; and a fourth step of selectively enabling one of a program state during which said indication mark information is not transferred, an indication mark state during which said application program is not operated and a common state during which said application program is permitted to operate and said indication mark information is transferred.

4. A method of controlling display of information in an information processing system having a plurality of information processing apparatuses each including an input device, a display device and a terminal control device, said plurality of information processing apparatuses being connected to each other by a communication line, said input device having at least a keyboard and a mouse, said method comprising:

a first step of controlling said input device, and said display device and communication on said communication line;

a second step of operating copies of an application program respectively stored in said plurality of information processing apparatuses in response to input information from any one of said input devices of said plurality of information processing apparatuses and transferring results obtained from operation of said copies of said application program to respective display devices of said plurality of information processing apparatuses such that the same results obtained by operation of said copies of said application program are displayed on said display devices of said plurality of information processing apparatuses;

a third step of displaying indication marks to indicate an arbitrary position on the screens of said display devices of said plurality of information processing apparatus in response to said input information from any one of said input devices such that the same indication mark is displayed on each display device of said plurality of information processing apparatuses; and a fourth step of selectively enabling one of a program state during which said indication mark information is not transferred, an indication mark state during which said application program is not operated and a common state during which said application program is permitted to operate and said indication mark information is transferred.

* * * * *